Patented Dec. 26, 1922.

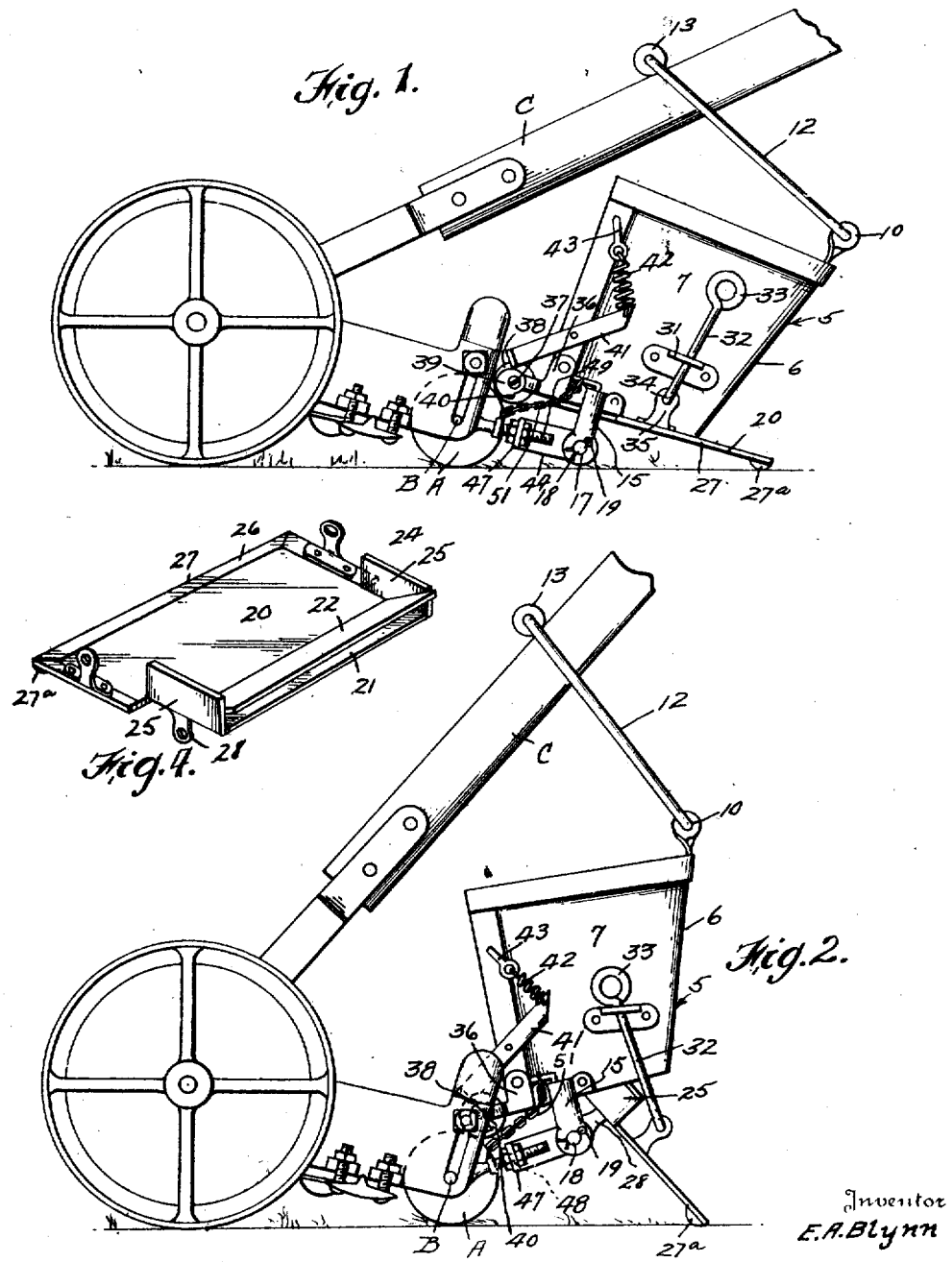

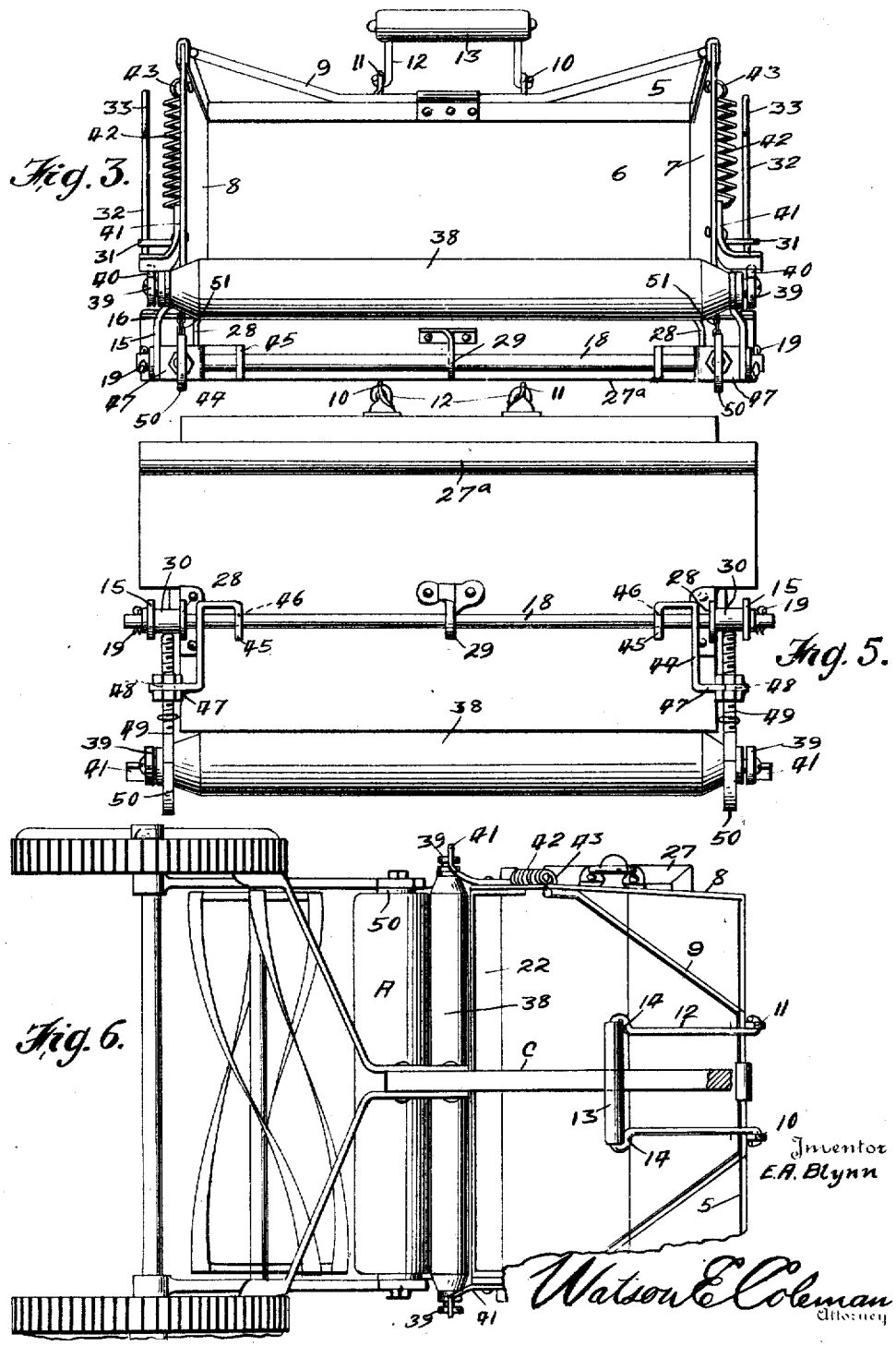

1,439,724

UNITED STATES PATENT OFFICE.

EDGAR A. BLYNN, OF GLOUCESTER, MASSACHUSETTS.

GRASS CATCHER FOR LAWN MOWERS.

Application filed August 22, 1921. Serial No. 494,179.

*To all whom it may concern:*

Be it known that I, EDGAR A. BLYNN, a citizen of the United States, residing at Gloucester, in the county of Essex and State of Massachusetts, have invented certain new and useful Improvements in Grass Catchers for Lawn Mowers, of which the following is a specification, reference being had to the accompanying drawings.

This invention relates to a grass catching attachment for lawn mowers and has for its object to provide a device of this character capable of being readily attached to any conventional form of lawn mower regardless of the manner in which the lawn mower is operated.

It is another object of the invention to provide a device of this character capable of being automatically operated to discharge grass collected by the device upon movement of the handle of the lawn mower in one direction.

It is also an object of the invention to provide a device of this character including a grass catching receptacle which is disposed adjacent the roller of the lawn mower and wherein means are provided for directing the grass into the receptacle.

It is a further object of the invention to provide a device of this character embodying a receptacle for the reception of grass, said receptacle having means for connection to the shaft of the roller of the lawn mower, said means being adjustable to accommodate said receptacle to various makes of lawn mowers.

It is a still further object of the invention to provide a device of this character embodying a receptacle having a pivoted bottom, and wherein the weight of said receptacle upon the bottom and engagement of the bottom with the ground serves to maintain the receptacle closed.

With these and other objects in view, the invention consists in the improved construction and arrangement of parts to be hereinafter more particularly described, fully claimed and illustrated in the accompanying drawings, in which:—

Figure 1 is a side elevation of a grass catcher for lawn mowers constructed in accordance with an embodiment of the invention, and showing the catcher in position to receive grass, Figure 2 is a side elevation showing the position of the parts when the grass is being discharged, Figure 3 is a front elevation of the grass catcher detached from the lawn mower, Figure 4 is a perspective view of the bottom of the catcher, Figure 5 is a bottom plan view of the catcher and structure shown in Figure 4, and Figure 6 is a top plan view of the catcher applied to a lawn mower.

Referring to the drawings, 5 designates the receptacle of the grass catcher, said receptacle including a back 6 and sides 7 and 8. The front, top and bottom portions are open. A suitable brace 9 is connected to the upper portions of each of the sides 7 and 8 and to the back for maintaining said receptacle in the proper shape. Projecting upwardly from the intermediate portion of the back adjacent the upper edge of said back, are ears 10 and 11 which are spaced from each other and are skewed so as to permit the openings in the ears to register. An operating member 12 is provided, said member being substantially U-shaped and has its ends engaged with the ears 10 and 11. A roller 13 is mounted on the intermediate portion of the operating member, the arms of said operating member being extended inwardly as at 14 to retain the roller in position. The roller 13 is adapted to engage the handle of a lawn mower, the purpose of which will hereinafter be described.

Projecting from the lower edge of each of the side members 7 and 8 and adjacent the forward end of the receptacle are brackets 15, each bracket being offset as at 16 and having an opening 17 for the reception of a shaft 18, the ends of the shaft projecting beyond the sides of the receptacle. The shaft is maintained in position by means of cotter pins 19 which are passed through the end portions of the shaft. A closure member or bottom 20 is provided for closing the bottom of the receptacle. This bottom consists of a sheet of material having an extension 21 projecting from its forward longitudinal edge, said extension being folded back upon the sheet substantially in parallel relation to the upper face of the bottom 20, the end of the extension being then folded back upon the extension in angular relation to said extension to provide a chute 22 and likewise a cleaner. The ends 24 of the sheet are slit adjacent their central portions, the forward portion 25 of said ends being extended upwardly to provide wings while a reinforcing member 26 is passed around the remaining edges 27 of said end portion and the rear longitudinal edge of the sheet. The portions 27, as well as the rear portion of the sheet extend beyond the sides and rear walls of the receptacle so as to insure a proper closing action of the receptacle and prevent the escape of grass. Secured to the lower face and rear portion of the closure member 20 is a strip or runner 27ª which is intended to engage the ground when the device is in use, to assist in holding the closure member closed.

Projecting from the lower face of the bottom or closure member 20 is a pair of brackets 28, said brackets being disposed adjacent the outer face of the wings and are adapted to receive the shaft 18 whereby the bottom or closure member is supported. A central bracket 29 is carried by the bottom of the receptacle, the bearing portion of said bracket being skewed so as to receive the shaft and thereby provide supporting means for the intermediate portion of the closure member. A spacing collar 30 is disposed between the brackets 28 and the brackets 15, said collar serving to prevent interference with the movement of the bottom when grass is being discharged. Projecting from each of the sides 7 and 8 of the receptacle and over the projecting portions 27 of the bottom is a bracket 31 through which a rod 32 is movable, the rod having a loop or eye 33 formed in its upper end to limit movement of the rod through the bearing. The opposite end of the rod 34 is connected to a bracket 35 which is carried by the edge 27 of the bottom immediately beneath the bracket 31, one of the brackets being provided for each end of the bottom. By this means, it is impossible for the bottom, when in its open position, to be disposed substantially vertically or to swing into engagement with the parts of the lawn mover, as movement of said bottom is limited by the loop or eye 33. The rod 32 also serves to maintain the bottom in the desired inclined position to permit the efficient discharge of grass.

Projecting from the forward portions of each of the sides 7 and 8 adjacent the closure member 20 is a pair of brackets 36, the bearing portions of said brackets being offset with respect to the base of the brackets and are adapted to receive the ends of trunnions or ends of a shaft 37, on which a roller 38 is mounted, the roller 38 being smaller in diameter than the roller A of the lawn mower and is adapted to be disposed closely adjacent the cleaner 22 so as to prevent discharge of grass between the cleaner and the roller. The main purpose of the roller 38 is to direct the grass into the receptacle. This roller is rotated by the roller A of the lawn mower and in the opposite direction to the rotation of the roller A.

To prevent reverse rotation of the roller 38 which would tend to direct the grass away from the receptacle, a novel stop mechanism is provided and comprises a plate 39 which is secured to each end of the shaft 37, said plate having a stop 40 which is formed by reducing a portion of the periphery of the plate. A pawl 41 is pivotally connected to the sides 7 and 8 above the brackets 36, and adjacent one end of the pawl, the opposite end of said pawl being disposed substantially at right angles and arranged to engage the periphery of the plate 39 so that said angular portion of the pawl will engage the stop 40. Connected to the first mentioned end of the pawl 41 is a spring 42, the opposite end of said spring being connected by means of a hook 43 to the upper portion of the sides 7 and 8. The function of the spring is to normally urge the pawl into engagement with the periphery of the plate 39 so that if the roller A of the lawn mower is rotated in a reverse direction, corresponding movement of the roller 38 is prevented by contact of the stop 40 with the end of the pawl 41. To permit the receptacle to be connected to various makes of lawn mowers, there is provided a bracket 44 having its end portion 45 bent substantially U-shaped the arms of said U-shaped portion being provided with registering openings 46 through which a portion of the shaft 18 extends. The opposite end portion 47 is extended at right angles to the main portion of the bracket and in the opposite direction to the end portion 45. The end portion 47 is provided with an opening 48 adapted to receive one end of an eye bolt 49, the threaded portion of said bolt being extended through the opening and nuts disposed on the bolt, one on each side of the end 47 so as to lock the bolt in an adjusted position. The eye 50 of each bolt is adapted to receive the adjacent end of the lawn mower roller shaft B, and is disposed between the roller and the bearing of the shaft B carried by the lawn mower.

To attach the device to a lawn mower, the roller A of the lawn mower is detached so as to permit the application of the eye bolts 49 to the ends of the shaft of the roller A. The roller is then replaced. By this means the receptacle 5 is also movably connected to the lawn mower. The handle C of the lawn mower is adapted to extend through the operating member 12, the roller 13 engaging the upper surface of the handle. As the lawn mower moves over the lawn in the grass cutting operation, the runner 27ª slides over the grass so as to sustain the weight of the receptacle and hold the bottom of the receptacle closed. Rotation of the roller A will cause reverse rotation of the roller 38, thereby guiding or directing the cut grass into the catcher or receptacle. The cleaner 22 during this operation not only cleans the roller, but prevents passage of the grass between the cleaner and the roller 38. When it is desired to discharge the grass, it is only necessary to swing the handle of the lawn mower forwardly, thereby causing the roller 13 to move along the handle to prevent friction and at the same time permitting the handle to raise the receptacle above the bottom, thereby opening the receptacle whereupon the bottom or closure member 20 will be positioned on an incline through the medium of the rods 32, so that the grass may be conveniently deposited without requiring removal of the receptacle from the lawn mower or the operation of any other parts of the device. A chain 51 is connected to each eye bolt, and to the sides of the receptacle. The purpose of said chains is to hold the receptacle in the proper position by limiting pivotal movement of the receptacle on the shaft 18, and thereby regulating movement of the receptacle with respect to the lawn mower. Upon lowering of the handle of the lawn mower to continue the cutting operation, the receptacle will descend through the medium of gravity into engagement with the closure member 20 which in turn will engage the ground, thereby closing the receptacle so as to position the parts for the reception of a new supply of grass.

From the foregoing it will be readily seen that this invention provides a novel form of grass catcher capable of being attached to any lawn mower regardless of whether it is driven by motive power, draft animals, or manually operated, and wherein it is possible to discharge the grass by simply raising the handle of the lawn mower. Furthermore, the novel connection of the attachment to the lawn mower permits the receptacle to be disposed on an incline which positions the device at the proper point to receive the grass severed by the cutter of the lawn mower.

What is claimed is:—

1. A grass catching attachment for lawn mowers embodying a receptacle open at its forward, upper and lower portions, brackets depending from said receptacle, a shaft journaled in said brackets, a closure member mounted on the shaft for closing the bottom of the receptacle, means carried by the receptacle and engaged with the closure member for limiting swinging movement of said closure member, means carried by said shaft for connecting the receptacle to a lawn mower, and means carried by the receptacle and engaged with the handle of the lawn mower for causing simultaneous movement of the receptacle and closure member away from each other or toward each other upon pivotal movement of the handle of the lawn mower.

2. A grass catching attachment for lawn mowers comprising a receptacle, a bottom pivoted to said receptacle, a portion of said bottom extending beyond the receptacle to engage the ground and support the receptacle, means for connecting said receptacle to a lawn mower above the ground, said bottom being normally held closed by contact of the projecting portion of said bottom with the ground.

3. A grass catching attachment for lawn mowers comprising a receptacle, a bottom pivoted to the receptacle, the forward portion of said bottom being formed into a chute, the rear portion of said bottom extending beyond the receptacle to engage the ground and support the receptacle in its closed position, and means for connecting the receptacle to a lawn mower.

4. A grass catching attachment for lawn mowers comprising a receptacle, a bottom pivoted adjacent one edge thereof to said receptacle, the opposite edge of the bottom being arranged to engage the ground and support the receptacle, an operating member pivoted to the upper portion of the receptacle, a roller carried by said operating member for engagement with the handle of the lawn mower, connecting means operatively connecting said receptacle to the roller of the lawn mower, said connecting means being movable relatively to the lawn mower and with the handle of the lawn mower to permit movement of the receptacle independently of the bottom to permit discharge of the contents of the receptacle.

5. A grass catching attachment for lawn mowers comprising a receptacle, a bottom pivoted to said receptacle, a roller pivoted to the forward portion of the receptacle closely adjacent one edge of the bottom, means for connecting said receptacle to the roller of a lawn mower, the roller of the receptacle being operable by the roller of the lawn mower to guide matter into the receptacle.

6. A grass catching attachment for lawn mowers comprising a receptacle, a bottom pivoted to said receptacle, a roller pivoted to the forward portion of the receptacle closely adjacent one edge of the bottom, means for connecting said receptacle to the roller of a lawn mower, the roller of the receptacle being operable by the roller of the lawn mower to guide matter into the receptacle, and means carried by the receptacle for engagement with the roller of the receptacle to prevent reverse rotation of said roller.

In testimony whereof I hereunto affix my signature.

EDGAR A. BLYNN.